(12) United States Patent
Rosmalen et al.

(10) Patent No.: US 7,129,622 B2
(45) Date of Patent: Oct. 31, 2006

(54) DRIVING APPARATUS, USE THEREOF AND AN OPTICAL SYSTEM COMPRISING SUCH APPARATUS

(75) Inventors: Gerard Eduard Rosmalen, Mierlo (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/528,624

(22) PCT Filed: Sep. 18, 2003

(86) PCT No.: PCT/IB03/04097

§ 371 (c)(1),
(2), (4) Date: Mar. 22, 2005

(87) PCT Pub. No.: WO2004/028741

PCT Pub. Date: Apr. 8, 2004

(65) Prior Publication Data

US 2005/0269905 A1   Dec. 8, 2005

(30) Foreign Application Priority Data

Sep. 25, 2002   (EP) .................................. 02078972

(51) Int. Cl.
*H01L 41/09* (2006.01)
*H02N 2/04* (2006.01)

(52) U.S. Cl. ............ 310/328; 310/323.01; 310/323.02; 310/323.03

(58) Field of Classification Search ................ 310/328, 310/323.02, 323.01, 323.03
See application file for complete search history.

(56) References Cited

U.S. PATENT DOCUMENTS

| 5,225,941 A | 7/1993 | Saito et al. |
| 5,633,763 A | 5/1997 | Suzuki et al. |
| 6,232,697 B1 | 5/2001 | Mizumoto |

FOREIGN PATENT DOCUMENTS

EP   0747977 A1   12/1996

*Primary Examiner*—Darren Schuberg
*Assistant Examiner*—Derek Rosenau
(74) *Attorney, Agent, or Firm*—Michael E. Belk

(57) ABSTRACT

A driving apparatus has at least two driving members and at least one driven member. Each of the driving members is frictionally engaged to the at least one driven member to move the driven member. The friction between each driven member and each driving member is such that the driven member moves when, over half of the driving members being in frictional engagement with the driven member, are moved, simultaneously between first and second positions. Further, the friction between each driven member and each driving member is such that the driven member substantially remains stationary when, less than half of the driving members being in frictional engagement with the driven member, are moved.

18 Claims, 2 Drawing Sheets

DRIVING APPARATUS, USE THEREOF AND AN OPTICAL SYSTEM COMPRISING SUCH APPARATUS

The invention relates to a driving apparatus.

Such an apparatus is known from practice and can be used in many different applications, in particular in applications wherein the driving apparatus has to be relatively small, such as in optical systems, zoom lenses, optical storage system drives, et cetera.

U.S. Pat. No. 5,225,941 describes a driving apparatus comprising a driving member which is frictionally engaged with a driven member. The frictional engagement is achieved using a leaf spring. A piezoelectric element is disposed in contact with the driving member for movement thereof. During use, a sawtooth voltage is applied to the piezoelectric element so as to make the speed of expansion of this element different from the speed of contraction thereof. Consequently, the driving member undergoes an alternating movement in opposite directions and at different speeds. The driving member moves the driven member only during the low speed motion thereof, leaving the driven member unmoved during the high speed motion thereof, resulting in a certain displacement of the driven member.

A further embodiment is described in U.S. Pat. No. 5,225,941, comprising two driving members, each of which is connected to a piezoelectric element, wherein each driving member is frictionally engaged with one respective driven member to change the position of that driven member. In that embodiment, each driving member provides a guiding support to the other driven member. The friction between such a guiding support and the driven member has to be relatively low to prevent clamping of the driven member during movement thereof. The American patent U.S. Pat. No. 6,232,697 describes an alternative driving apparatus, comprising two driving shafts having piezoelectric elements, wherein the slow and rapid displacements of a first and a second piezoelectric element are applied at different times.

A problem of the known apparatus is on the one hand the inherent difficulty to appropriately tune the friction between the driving members and the driven members and on the other hand to choose and control the speeds of the driving members to such degree that the driven members perform desired movements. A further problem is a relatively high chance of failure of the apparatus. Such failure may arise when the friction between the driving member and the driven member varies during use. Variation of said friction may occur, for instance, because of certain contamination of the device, such as particles and/or dust unexpectedly present between a driving and a driven member. Furthermore, friction changes may arise from changing conditions of the environment, such as alteration of the humidity and/or temperature.

It is an object of the present invention to solve the above-mentioned problems, in particular to provide a relatively compact driving apparatus which has relatively little chance of failure.

The present invention provides a driving apparatus, comprising at least two driving members and at least one driven member, wherein the at least two driving members are frictionally engaged to the at least one driven member to move said driven member, wherein the friction between each driven member and each driving member is such that the driven member moves when over half of the driving members being in frictional engagement with said driven member are moved between a first and a second position, wherein the friction between said driven member and each driving member is such that the driven member remains stationary when less than half of the driving members are moved.

This driving apparatus is relatively reliable, since at least two, and preferably three, driving members are provided to move each driven member, using said friction which is provided between these members. This friction results in the driven member being moved or being held stationary in case over half of the driving members are or are not set in motion, respectively. Consequently, in case over half of the driving members are not set in motion, the remaining driving members can be moved without affecting the position of the driven member, for example to bring the remaining driving members back to a starting position. Preferably at least three driving members are provided to frictionally engage a driven member, so that two of the driving members can hold the driven member relatively firmly in position when the other driving member is moved back to a starting position, so as to avoid said other driving member pulling the driven member back with it.

Furthermore, the apparatus according to the invention has the advantage that it can be made relatively compact, robust and of relatively few parts. Consequently, the apparatus can be advantageously utilized in applications wherein little space is available, such as in certain optical systems.

The driving apparatus according to the present invention can advantageously be used by carrying out the following steps in an appropriate order:

a) over half of the driving members that are frictionally engaged to the driven member are moved from a first to a second position at substantially the same time; and b) the driving members are returned from the second to the first position in groups comprising less than half of the driving members.

During step a), the driven member is moved by the driving members since over half of the driving members engaged thereto are moved in a certain desired direction at the same time. During step b), the driving members can be retracted back to the first position without pulling the driven member back in a reversed direction, since groups comprising less than half the number of driving members are retracted one after another. After that, steps a) and b) may be repeated to move the driven member over a further distance in said desired direction.

Advantageously, more than one driven member are provided, which can be independently moved by a number of driving members. For example, a first driving member can be frictionally engaged to a first driven member only, whereas a second driving member is frictionally engaged to a second driven member only. In that case, a third driving member can be provided which is frictionally engaged to both the first and the second driven member. Then, the first driven member is movable by applying steps a) and b) to the first and the third driving member, irrespective of the condition of the second driving member. In the same manner, the second driven member is movable by applying steps a) and b) to the second and the third driving member, irrespective of the condition of the first driving member.

Further advantageous embodiments of the driving apparatus according to the invention are described in the dependent claims.

The invention also relates to an optical system comprising the driving apparatus according to the invention. Such a system includes a system carrying optical components. In the optical system according to the invention, the system is fixed to the driven member or members. The system can be used for writing information in or reading information from an optical disc, such as CD or DVD.

The invention will now be described in more detail on the basis of exemplary embodiments shown in the accompanying drawings.

Figure 1:
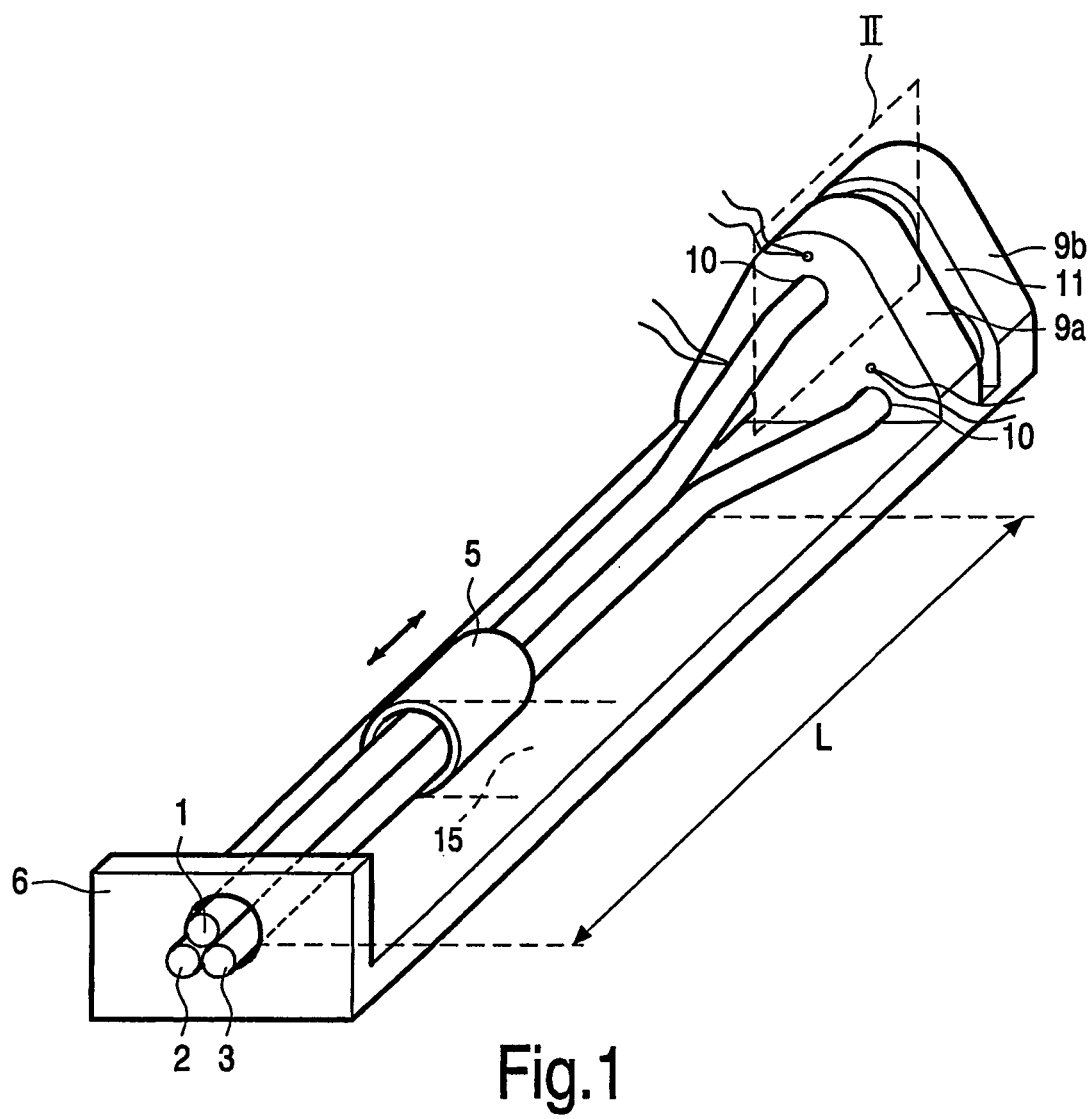
FIG. 1 is a perspective view of a first embodiment of the invention.

FIG. 1 shows an embodiment of a driving apparatus, comprising three driving members 1, 2, 3 and one driven member 5. The driven member 5 comprises a cylindrical element. Each of the driving members 1, 2, 3 is frictionally engaged to the driven member 5 to move said driven member 5 over a distance L. To this end, each of the driving members comprises an elongated member 1, 2, 3, particularly a shaft, which extends partially through the cylindrical driven member 5. Further, the driving shafts 1, 2, 3 extend parallel and adjacent to each other in a closely packed arrangement over said distance L. Therefore, the three driving shafts 1, 2, 3 together form a guiding axis for guiding the cylindrical driven member 5 over said distance L. It is to be observed that the prior art documents U.S. Pat. No. 5,225,941 and U.S. Pat. No. 6,232,697 disclose apparatus wherein each driving shaft is frictionally engaged to only one driven member for moving that driven member, leading to the above-mentioned problems. Further, said prior art discloses that each driving shaft serves only as a low-friction guide shaft for another driven member, and thus is not able to set the other driven member in motion.

Figure 2:
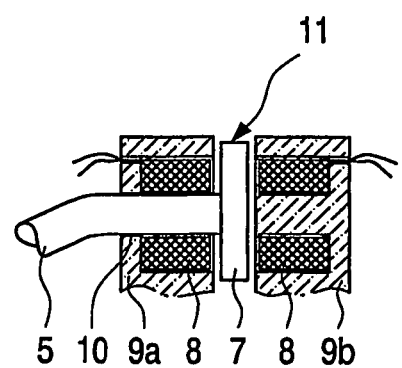
FIG. 2 is a sectional view taken on plane II of the view of FIG. 1.

The three driving shafts 1, 2, 3 are movably supported at one end by a support 6. From this support 6, the driving shafts 1, 2, 3 extend along said distance L adjacent to each other in said packed arrangement, then over a certain distance at relatively small angles away from each other and finally through spaced apart apertures 10 of a first frame 9a towards a second frame 9b. Each of the driving shafts 1, 2, 3 is provided with a flange 7 which is movably arranged in a space 11 between said frames 9a, 9b, as is shown in FIG. 2. Both frames 9 are provided with piezoelectric elements 8 which are arranged to engage said flanges 7 for independently moving each of the driving shafts 1, 2, 3 over a relatively short distance, said short distance being the width of said space 11 minus the thickness of said flange 7. In particular, the piezoelectric elements 8 can move each driving shaft 1, 2, 3 between a first position wherein the respective flange 7 adjoins the first frame 9a, and a second position wherein the respective flange 7 adjoins the second frame 9b.

The friction between the cylindrical driven member 5 and each driving shaft 1, 2, 3 is such that the driven member 5 moves when at least two of the three driving shafts 1, 2, 3 are moved. Further, the friction between each driven member 5 and each driving shaft 1, 2, 3 is such that the driven member 5 remains still when each driving shaft 1, 2, 3 is moved by itself between the first and the second position. To this end, the cylindrical driven member 5 may be of a resilient material so as to engage each of the elongated driving shafts 1, 2, 3 resiliently. Further, each of the driving shafts 1, 2, 3 may have a specific outer surface roughness or smoothness and/or the driven member 5 may have a certain inner surface roughness or smoothness to provide a desired friction. For instance, the friction between the driven member 5 and each of the driving members 1, 2, 3 can be substantially equal. The driven member 5 may be part of or may be fixed to a slide 15. The slide 15 may be part of an optical scanning system, in which case the slide carries optical components, such as an objective lens.

During use, the driven member 5 can be moved as follows over said distance L towards the pair of frames 9. First, during a step a) at least two but preferably all of the three driving shafts 1, 2, 3 are moved from said first to said second position by the piezoelectric elements 8 over the above-mentioned short distance at substantially the same time. Consequently, the driven member 5 is pulled along by the frictionally engaging driving shafts 1, 2, 3 over said short distance towards the first frame 9a. Next, during a step b), the driving shafts 1, 2, 3 are successively returned from the second to the first position. Therefore, as each driving shaft returns the other two driving shafts restrain the driven member 5 from being pulled back by said returning driving shaft, so that the driven member 5 remains in position.

By repeating said steps a) and b), the driving shafts 1, 2, 3 can move the driven member 5 substantially over any part of the distance L. The chance of clamping between the driven member and each of said driving shafts 1, 2, 3 is relatively small, since the driving shafts 1, 2, 3 are arranged adjacent to each other such that together they form a guiding axis. The driving apparatus shown in FIG. 1 has relatively little chance of failure, since three driving shafts are frictionally engaged to the driven member to carry out the above steps. In particular, during step b) the frictional restraining forces applied by the two motionless driving shafts on the driven member 5 will be considerably higher than a frictional pulling force applied thereon by the returning driving shaft, so that each driving shaft can be returned safely to the first position without changing the position of the driven member 5. The driven member 5 can be moved in a reverse direction, towards the support 6, by applying said steps a) and b) whilst reversing the movements of the driving shafts 1, 2, 3.

Figure 3:
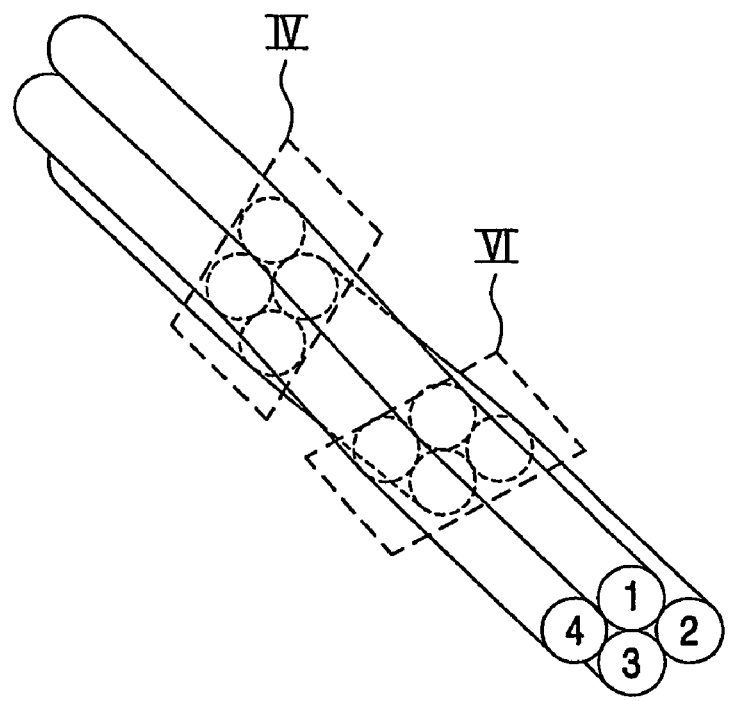
FIG. 3 is a perspective view of a second embodiment of the invention comprising three driving shafts and one stationary shaft.

FIG. 3 shows part of a second embodiment comprising four substantially parallel shafts 1, 2, 3, 4, arranged in two separate closely packed formations so as to form a guiding axis for a driven member 5. In this embodiment, the first shaft 1, second shaft 2 and third shaft 3 are arranged in the same way as in the previous embodiment of FIG. 1, i.e. each of these shafts 1, 2, 3 is movable over said relatively short distance. The fourth shaft 4 is unmovable.

Figure 4:
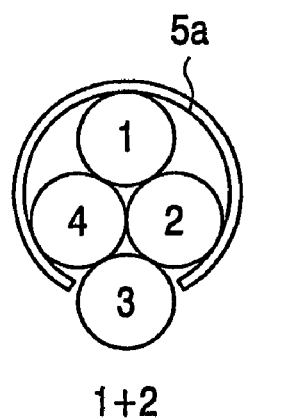
FIG. 4 is a section IV of FIG. 3, showing the driving members engaging a first driven member.
Figure 5:
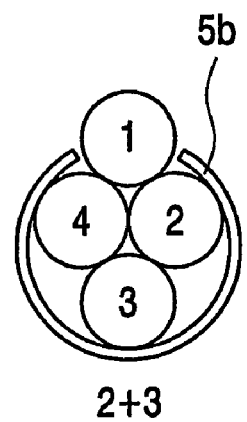
FIG. 5 is a similar section as that shown in FIG. 4, showing the driving members engaging a second driven member.

One part of the four parallel driving shafts 1, 2, 3, 4 is packed such that the second and fourth shaft 2, 4 abut each other, as is shown in section IV of FIGS. 4 and 5. An other part of the four shafts 1, 2, 3, 4 is packed such that the first and third shaft 1, 3 abut each other, as is shown in section VI of in FIG. 6. In between said closely packed formations, the shafts 1, 2, 3, 4 comprise a not closely packed formation.

Figure 6:
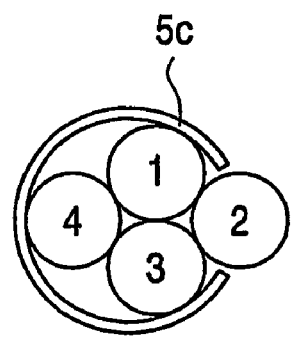
FIG. 6 is a section VI of FIG. 2, showing the driving members engaging a third driven member.

The embodiment of FIG. 3 can be used to move three driven members 5 independently of each other, which is illustrated in FIGS. 4–6 with three driven members 5a, 5b, 5c. To that end, each of the driven members 5 comprises a section of a cylindrical element, such that this driven member 5 can be frictionally engaged by only three of the four shafts 1, 2, 3, 4 whilst the other of the shafts 1, 2, 3, 4 protrudes through the longitudinal aperture of the cylinder section.

In FIG. 4, a first driven member 5a surrounds parts of the first and second driving shaft 1, 2 and the stationary shaft 4 such that the driven member 5a is frictionally engaged by these three shafts 1, 2, 4. The third driving shaft 3 protrudes through the aperture of the driven member 5a so that the third driving shaft 3 does not frictionally engage the driven member 5a. Said steps a) and b) are simply carried out using the first and the second driving shaft 1, 2 in order to move the driven member 5a.

In FIG. 5, a second driven member 5b is frictionally engaged by the second and third driving shaft 2, 3 and by the stationary shaft 4. The first driving shaft 1 protrudes through the aperture of the driven member 5a so that the first driving shaft 1 does not frictionally engage the driven member 5a. Consequently, for moving the second driven member 5b, said steps a) and b) are simply carried out using the second and the third driving shaft 2, 3. This movement is independent of the movement of the first driven member 5a, since the first driven member 5a is held in position by the first and the fourth shaft 1, 4 during the movement of the second and the third driving shaft 2, 3.

FIGS. 4 and 5 show the utilization of the first packed formation of the four shafts 1–4 for moving two driven members 5a, 5b independently. Utilization of the second packed formation is shown in FIG. 6. Therein, a third driven member 5c is frictionally engaged by the first and the third driving shaft 1, 3 and by the stationary shaft 4. In this case, the second driving shaft 2 protrudes through the aperture of the driven member 5c so that the second driving shaft 2 does not frictionally engage the driven member 5c. For moving the driven member 5c, said steps a) and b) are simply carried out using the first and the third driving shaft 1, 3.

From the above it follows that the first, second and third driven member 5a, 5b, 5c can also be moved in desired combinations at the same time by setting the appropriate combination of driving shafts 1, 2, 3 in motion.

Although the illustrative embodiments of the present invention have been described in greater detail with reference to the accompanying drawings, it is to be understood that the invention is not limited to those embodiments thereof. Various changes or modifications may be effected by one skilled in the art without departing from the scope or the spirit of the invention as defined in the claims.

For instance, each driving member may be formed in many different ways. Each driving member may comprise, for example, a wire, a shaft, a rod, a bar, a plate, or a combination of such and/or different elements. The driving member may comprises different materials, such as a metal, an alloy, a plastic or a combination of such and/or other materials.

During use, each driving member may be moved at different speeds for moving the driven member and/or for retracting the driving member in case the driving member must not move the driven member. Movement of each driving member can be accomplished by different means, such as piezoelectric elements, electrical actuators, electromagnets and the like.

Furthermore, the friction of the frictional engagement between the driven member and each of the driving members may be substantially equal or may be different. The frictional engagement may be provided in different ways, for example using bearings or the like.

Besides, the apparatus may comprise more that four shafts to move a larger number of driven members. For example, in case the embodiment shown in FIG. 3 comprises five shafts, six independent translations can be carried out. The apparatus can still be relatively compact and simple in the case that the apparatus comprises a large number of driven members, since the number of driving members does not rise linearly with the number of driven members, this in contrast with said known apparatus wherein one driving member is applied for the movement of one driven member.

Furthermore, each driven member may be formed in many different ways, and it may comprise many different materials, such as a metal, an alloy, a plastic or a combination of such and/or other materials.

The invention claimed is:

1. A driving apparatus comprising at least two driving members and at least one driven member, wherein each of the at least two driving members is frictionally engaged to the at least three driven members to move said driven member, wherein the friction between each driven member and each driving member is such that the driven member moves when over half of the driving members being in frictional engagement with said driven member are moved simultaneously between a first and a second position, wherein the friction between each driven member and each driving member is such that the driven member substantially remains stationary when less than half of the driving members being in frictional engagement with said driven member are moved.

2. The driving apparatus according to claim 1, wherein the apparatus comprises at least two piezoelectric elements arranged to move the at least two driving members independently.

3. The driving apparatus according to claim 1, wherein the apparatus comprises at least four driving members.

4. The driving apparatus according to claim 1, wherein each of the driving members is at least partially surrounded by part of the at least one driven member.

5. The driving apparatus according to claim 1, wherein each driving member comprises an elongated member.

6. The driving apparatus according to claim 1, wherein the driving members are substantially parallel over a certain distance.

7. An optical system comprising a slide and the driving apparatus according to claim 1, wherein the slide is fixed to the at least one driven member.

8. A driving apparatus comprising at least three driving members and at least one driven member, wherein each of the at least two driving members is frictionally engaged to the at least one driven member to move said driven member, wherein the friction between each driven member and each driving member is such that the driven member moves when over half of the driving members being in frictional engagement with said driven member are moved simultaneously between a first and a second position, wherein the friction between each driven member and each driving member is such that the driven member substantially remains stationary when less than half of the driving members being in frictional engagement with said driven member are moved.

9. The driving apparatus according to claim 8, wherein the apparatus comprises at least two driven members.

10. The driving apparatus according to claim 8, wherein a first driving member is frictionally engaged to a first driven member only, wherein a second driving member is frictionally engaged to a second driven member only, wherein a third driving member is frictionally engaged to both the first and the second driven member.

11. The driving apparatus according to claim 10, wherein each driven member comprises a section of a substantially cylindrical element.

12. The driving apparatus according to claim 11, wherein the at least two driving members extend adjacent to each other over a certain distance.

13. A method of moving a driven member of a driving apparatus, the method comprising the acts of:
   moving over half of at least three driving members of the driving apparatus that are frictionally engaged to the driven member from a first to a second position at substantially the same time; and
   returning the at least three driving members from the second to the first position in groups comprising less than half of the at least three driving members, wherein the driven member substantially remains stationary during said returning act.

14. The method according to claim 13, wherein said moving and returning acts are repeated until said driven member has been moved over a desired distance.

15. A driving apparatus comprising:
   at least three driving members;
   at least one driven member; and
   means for moving the driven member by moving over half of the at least three driving members that are frictionally engaged to the driven member;
   wherein said means for moving is further configured to substantially maintain stationary the driven member while moving less than half of the at least three driving members.

16. The driving apparatus of claim 15, wherein the at least three driving members are at least partially surrounded by part of the at least one driven member.

17. A driving comprising:
   at least two driving members;
   at least one driven member; and
   means for moving the driven member by moving over half of the at least two driving members that are frictionally engaged to the driven member;
   wherein said means for moving is further configured to substantially maintain stationary the driven member while moving less than half of the driving members,
   wherein the means for moving is configured to bring the at least two driving members into contact with each other to frictionally engage and move the at least one driven member.

18. A driving comprising:
   at least two driving members;
   at least one driven member; and
   means for moving the driven member by moving over half of the at least two driving members that are frictionally engaged to the driven member;
   wherein said means for moving is further configured to substantially maintain stationary the driven member while moving less than half of the driving members,
   wherein the at least one driven member comprises a section of a substantially cylindrical element at least partially surrounding the at least two driving members.

* * * * *